United States Patent [19]

Hayashi

[11] Patent Number: 4,614,865

[45] Date of Patent: * Sep. 30, 1986

[54] METHOD OF DETECTING A FOCUS CONDITION OF AN IMAGING OPTICAL SYSTEM BY IMAGE SHARPNESS AND LATERAL SHIFT TECHNIQUES

[75] Inventor: Asao Hayashi, Hachioji, Japan

[73] Assignee: Olympus Optical Co., Ltd., Tokyo, Japan

[ * ] Notice: The portion of the term of this patent subsequent to Jan. 8, 2002 has been disclaimed.

[21] Appl. No.: 552,479

[22] Filed: Nov. 16, 1983

[30] Foreign Application Priority Data

Nov. 22, 1982 [JP]   Japan ................................ 57-205025

[51] Int. Cl.⁴ .............................................. G01V 1/20
[52] U.S. Cl. ..................... 250/201; 354/407
[58] Field of Search ............... 250/201, 204, 208, 209, 250/216; 354/403–408

[56] References Cited

U.S. PATENT DOCUMENTS

| | | | |
|---|---|---|---|
| 4,297,014 | 10/1981 | Nakamura et al. | 250/209 |
| 4,492,449 | 1/1985 | Oinoue et al. | 250/201 |

Primary Examiner—David C. Nelms
Attorney, Agent, or Firm—Parkhurst & Oliff

[57] ABSTRACT

A method of detecting a focus condition of an imaging optical system such as a camera, a microscope, a high density optical recording and reproducing apparatus or the like is disclosed. The method comprises a step of selecting, in accordance with the state of density distribution of the optical image, between an image sharpness detection method for detecting in-focused condition by obtaining an evaluation value representing sharpness of images projected upon a photoelectric detecting means and an image lateral shift detection method for detecting in-focused condition by a positional relation between an image projected upon the photoelectric detecting means by light fluxes transmitted through a part of an exit pupil of an optical lens and an image projected upon the photoelectric detecting means by light fluxes transmitted through the other part of the exit pupil of the lens.

13 Claims, 13 Drawing Figures

METHOD OF DETECTING A FOCUS CONDITION OF AN IMAGING OPTICAL SYSTEM BY IMAGE SHARPNESS AND LATERAL SHIFT TECHNIQUES

BACKGROUND OF THE INVENTION

The present invention relates to a method of detecting a focus condition of an imaging optical system such as a camera, a microscope, a high density optical recording and reproducing apparatus or the like.

Two methods have been developed for detecting an in-focused condition of an object image formed by an imaging optical system, one being an image sharpness detection method and the other being an image lateral shift detection method. Each of these methods has not only superior merit, but also a defect so that the use of only one method cannot attain a detection of focus condition with high precision. That is, the image sharpness detection method has a poor detection sensitivity to an image including a low space frequency component and the image lateral shift detection method has a poor detection sensitivity to a low contrast image (the image having small difference between the maximum value and the minimum value of contrast intensity). The image sharpness detection method also has a defect that the direction of front focus and rear focus cannot be detected in the position sufficiently apart from the in-focused position.

Figure 1A:
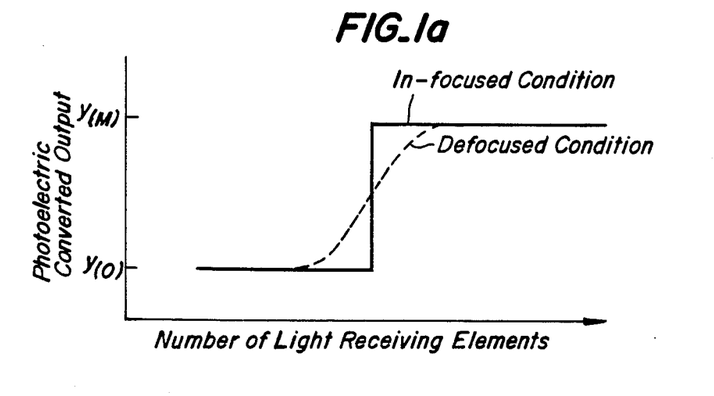
FIGS. 1a and 1b are explanatory views showing a relation between a position of light receiving element and an output of photoelectric conversion element by an image sharpness detection method for an object to be photographed.
Figure 1B:
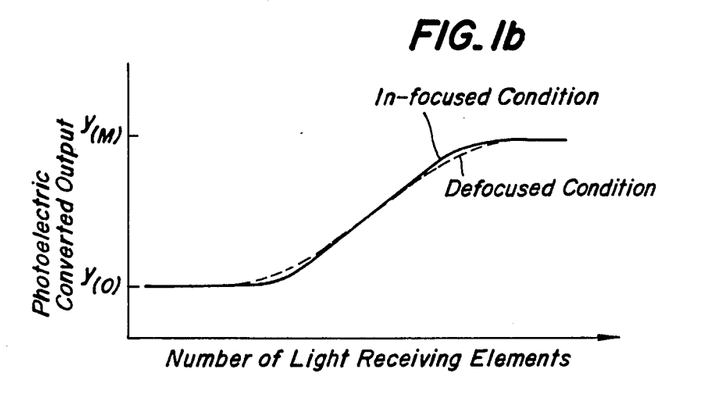
Figure 2A:
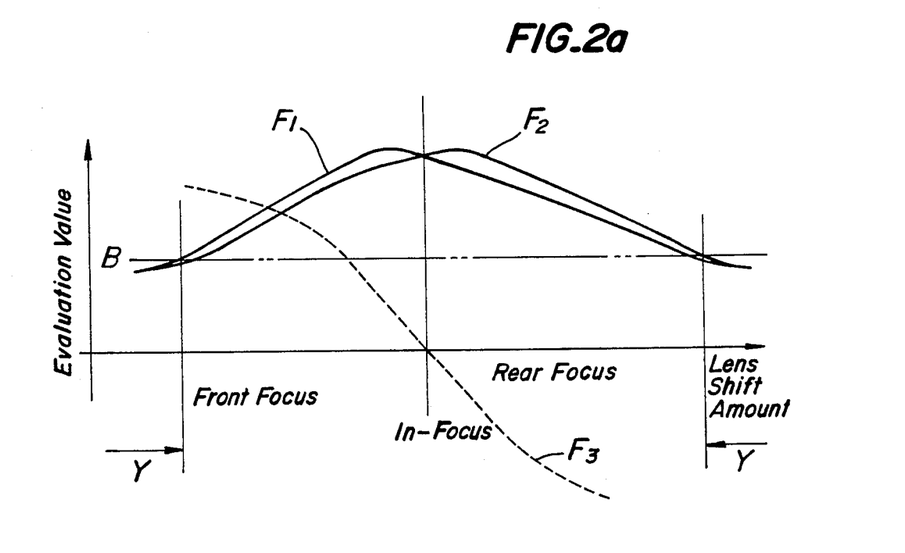
FIGS. 2a and 2b are explanatory views showing evaluation values of defocused image and lateral shifted image for explaining the conventional focus condition detecting method.
Figure 2B:
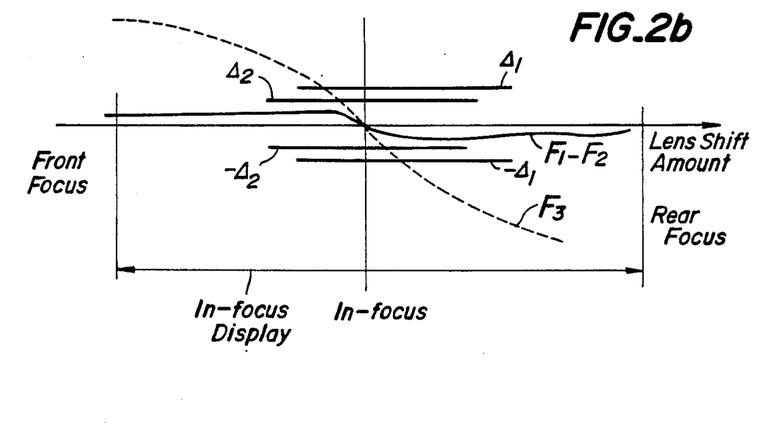
Figure 3A:
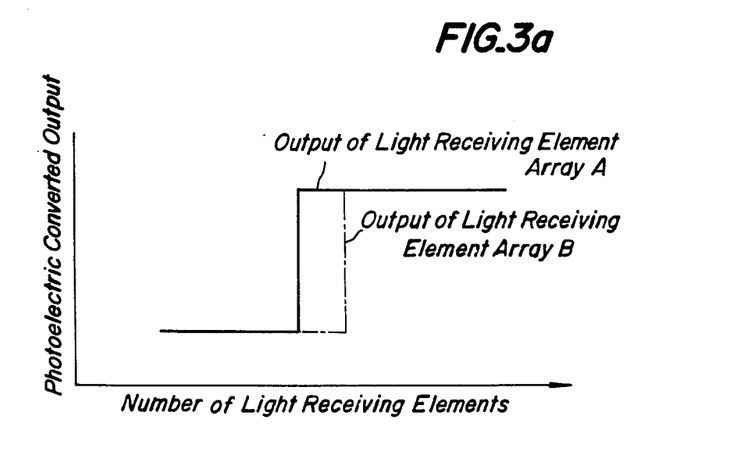
FIGS. 3a and 3b are explanatory views showing a relation between a position of light receiving element and an output of photoelectric conversion element by an image lateral shift detection method for an object to be photographed.
Figure 3B:
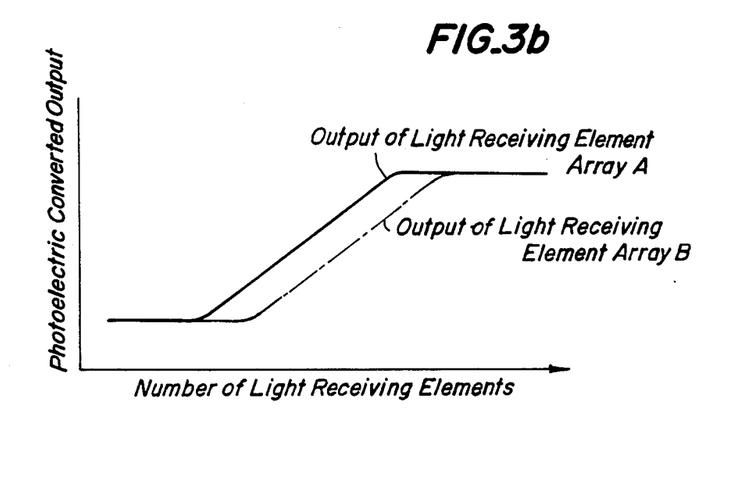

In order to overcome the above defects, the present applicant provides an apparatus for detecting focus condition by combining the above two detection methods in Japanese Patent Laid-open No. 169,617/82 and Japanese Patent Application No. 95,869/82. In these apparatuses both detection methods are combined. That is, the image lateral shift detection method is utilized in the large defocused region and in the small defocused region the focus condition is detected by only the image sharpness detection method or a combination of the image sharpness detection method and the image lateral shift detecting method. For example, consider FIGS. 1a and 1b, wherein the inclination of the photoelectric converted outputs of light incident upon a light receiving element array used for image sharpness detection is large as in FIG. 1a and the inclination of the photoelectric converted outputs is small as in FIG. 1b. In the large inclination as shown in FIG. 1a, the conventional method can be utilized because of the large difference between the in-focused condition and the defocused condition. In the small inclination as shown in FIG. 1b, the focus condition cannot be detected by the image sharpness detection method because of the very small difference between the in-focused condition and the defocused condition. FIGS. 2a and 2b are graphs showing the evaluation function values of the image, providing that $F_1$ or $$F_2 = \sum_{j=1}^{k-1} M_j$$

and $$F_3 = \sum_i (|A_{i+1} - B_i| - |A_i - B_{i+1}|).$$

wherein $F_1$ and $F_2$ are evaluation function values obtained by the image sharpness method, $F_3$ is an evaluation function value obtained by the lateral shift method, $M_j$ is a maximum absolute value of the difference between outputs of adjacent light receiving elements $j$, and $A_i$ and $B_i$ are outputs of respective light receiving elements in the light receiving element array which receives the lights passing through one and the other imaging lenses. In FIGS. 2a, and 2b, when the inclination of evaluation value is small as shown in FIG. 1b, evaluation values $F_1$ and $F_2$ of the defocused image are larger than the threshold value B as shown in FIG. 2a while the difference of these evaluation values is small, so that the evaluation function $F_1-F_2$ for focusing detection is placed between the threshold value $\pm\Delta_1$ for focus detection and thus the display width of focusing condition becomes larger than the focus depth resulting in the incapability of deciding precise focusing. However, in the image lateral shift detection method, as shown in FIGS. 3a and 3b by the output of elements in light receiving element arrays A and B, laterally shifted amounts of image between arrays A and B are substantially not changed for the inclination of photoelectric converted outputs so that the focusing decision by the image lateral shift detection method can be effected with sufficient precision in the same manner as the conventional means as shown in FIG. 2b.

SUMMARY OF THE INVENTION

It is an object of the present invention to eliminate the above described disadvantage of the conventional focus condition detecting method.

It is another object of the present invention to provide a method of detecting a focus condition of an imaging optical system capable of detecting accurate focus condition by a simple aglorithm, regardless of the kind of images, by performing focus detection by detecting both the image sharpness condition and the image lateral shift condition.

According to the present invention, there is provided a method of detecting a focus condition of an imaging optical system by combining an image sharpness detection method for detecting in-focused condition by obtaining an evaluation value representing sharpness of images projected upon a photoelectric detecting means and an image lateral shift detection method for detecting in-focused condition by a positional relation between an image projected upon the photoelectric detecting means by light fluxes transmitted through a part of an exit pupil of an optical lens and an image projected upon the photoelectric detecting means by light fluxes transmitted through the other part of the exit pupil of the lens, characterized by comprising a step of selecting the image sharpness detection method and the image lateral shift detection method in accordance with the state of density distribution of the image thereby detecting the in-focused condition.

DETAILED EXPLANATION OF THE PREFERRED EMBODIMENTS

Figure 4:
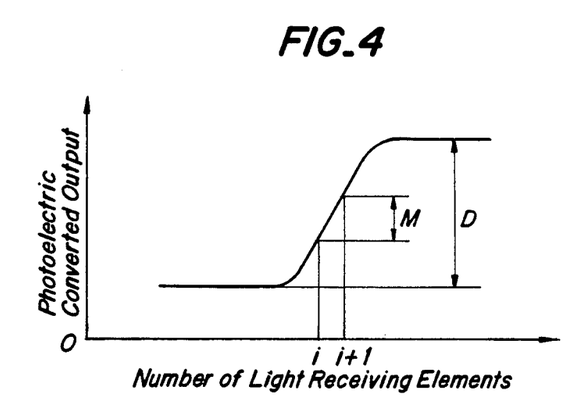
FIG. 4 is an explanatory view showing an example of density change of the object to be photographed as a photoelectric converted output.

FIG. 4 shows one example of the density change of the image as a photoelectric converted output. In the focus condition detecting method according to the present invention as shown in FIG. 4, the detection of focus condition is performed by using decision values M and D which are defined as follows. Providing that maximum value and minimum value of photoelectric converted outputs of the light receiving element array are $X_{max}$ and $X_{min}$, respectively, the difference D of these values can be obtained as follows:

$$D = X_{max} - X_{min}$$

Providing that the photoelectric converted output of the n-th element of the light receiving element array is defined as $X_n$, the absolute maximum value M of the difference of outputs between adjacent light receiving elements can be obtained as follows.

$$M = |X_n - X_{n+1}|_{max}$$

Hereinafter, one embodiment of the focus condition detecting method according to the present invention will be explained with the use of the decision values M and D.

Figure 5:
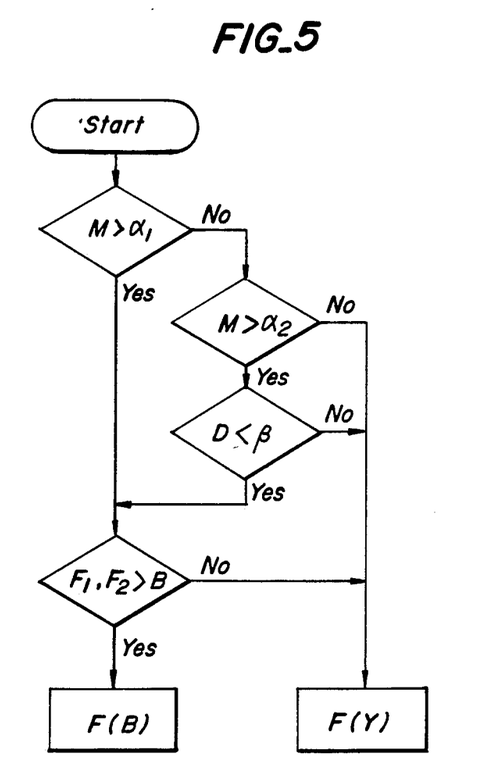
FIG. 5 is a flow chart showing one embodiment of a focus condition detecting method according to the present invention.
Figure 6A:
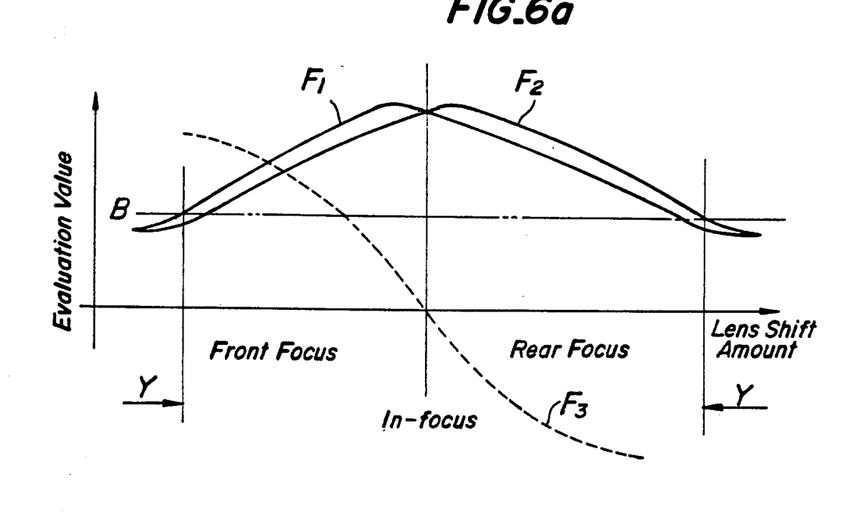
FIGS. 6a and 6b are explanatory views showing evaluation values of defocused image and lateral shifted image for explaining the focus condition detecting method shown in FIG. 5.

FIG. 5 is a flow chart showing one embodiment of the focus condition detecting method according to the present invention. In this embodiment, by taking into consideration the point that when the decision of focusing condition by the image sharpness detection method is performed for the image having small inclination of strength distribution of the object to be photographed as described above, the precise focus condition cannot be decided, the algorithm is adapted for such an object to be photographed by using the image lateral shift detection method thereby performing a decision of focus condition. In the flow chart shown in FIG. 5, the above decision value M is compared with the threshold value $\alpha_1$, $\alpha_2$ ($\alpha_1 > \alpha_2$) of preset inclination. When the decision value M is larger than the threshold value $\alpha_1$, that is, when the inclination is large, the focus condition is detected by the difference $F_{(B)} = F_1 - F_2$ of the evaluation function values of the defocused image. Even if the above inclination is large, however, when the value of evaluation function values $F_1$ and $F_2$ of defocused image is smaller than the preset threshold value B as shown in FIG. 6, that is, in the region shown in FIG. 6a by Y, the focus condition is decided by the evaluation function value $F_{(Y)} = F_3$ of the image lateral shift detection method since the decision by the image sharpness detection method becomes inaccurate. Then, when the inclination M is smaller than the threshold value $\alpha_2$ (naturally smaller than the value $\alpha_1$), that is, when the inclination is small, the focus condition is decided by the evaluation function value $F_{(Y)}$ of the image lateral shift detection method as described above. When the inclination M is positioned between the threshold values $\alpha_1$ and $\alpha_2$, the prefered method cannot be decided by the inclination only so that the above described decision value D is used as a comparison factor. That is, when the decision value D is smaller than the preset threshold value $\beta$, i.e. in the case of low contrast image, the focus condition is generally decided by the evaluation function value $F_{(B)}$ of the image sharpness detection method, while the evaluation function value $F_{(Y)}$ is used for region Y shown in FIG. 6a as described above. When the decision value D is larger than the threshold value $\beta$, that is, in the case of high contrast image, the focus condition is decided by the evaluation function value $F_{(Y)}$ of the image lateral shift detection method. The threshold values $\alpha_1$, $\alpha_2$, $\beta$, B can properly be determined in accordance with each kind of object to be photographed and the adopted evaluation function.

Figure 6B:
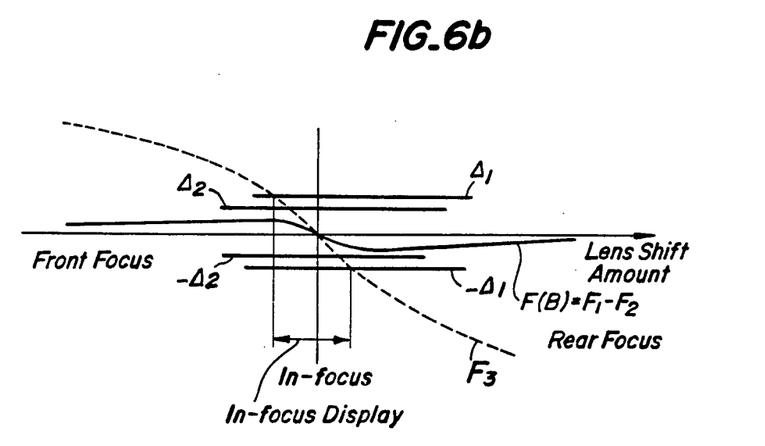

In the present embodiment, the selection of the focus condition deciding method is performed by the above described algorithm so that even in the case of the object to be photographed as shown in FIG. 1b, for which precise in-focusing decision cannot be performed by prior methods the precise in-focusing decision can be performed. For example, as shown in FIGS. 6a and 6b the evaluation value $F_{(B)}$ of the image sharpness detection method is placed within in-focused region $\pm \Delta_2$ in which region a precise in-focusing decision cannot be performed by the image sharpness detection method. In the case of utilizing the evaluation value $F_{(Y)}$ of the image lateral shift detection method, the in-focusing condition is performed by only in-focusing within the region shown in FIG. 6b between the threshold values $\pm \Delta_1$ so that precise in-focus detection can be performed.

Figure 7:
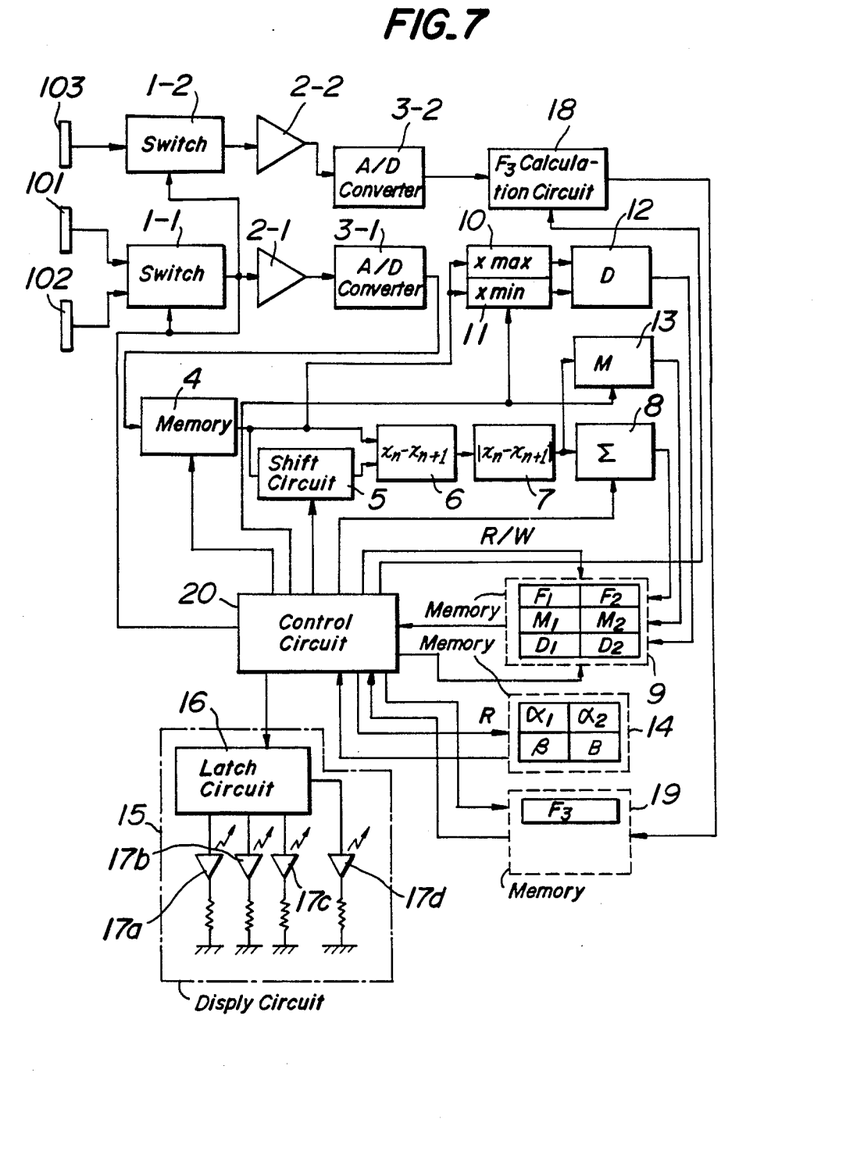
FIG. 7 is a block diagram showing construction of an apparatus for carrying out the focus condition detecting method according to the present invention.

FIG. 7 shows a block diagram illustrating a construction of one embodiment of the apparatus for carrying out the focus condition detecting method according to the present invention. In this embodiment, the outputs of light receiving element arrays 101 and 102 are selected by a change-over switch 1-1 controlled by a control circuit 20. At first, when the output of the light receiving element array 101 is selected, the photoelectric converted outputs of respective light receiving elements are amplified by an amplifier 2-1, A/D converted by an A/D converter 3-1, and stored by a memory 4, in that order. After the output signals (A/D converted values) of all elements of light receiving element array 101 are stored in the memory 4, the difference $X_n - X_{n+1}$ of output signals $X_n$, $X_{n+1}$ of adjacent light receiving elements are obtained by a shift circuit 5 and a substraction circuit 6. The absolute value of the difference $X_n - X_{n+1}$ is arithmetically operated by an absolute value circuit 7 and a sum $\Sigma |X_n - X_{n+1}|$ of the absolute value $|X_n - X_{n+1}|$ for all light receiving elements is arithmetically operated by an adder 8 thereby obtaining an evaluation function value $F_1$ which is then stored in a region $F_1$ of a memory 9. The maximum value $X_{max}$ and the minimum value $X_{min}$ of output signals successively read out from the memory 4 are detected by a maximum value detection circuit 10 and a minimum value detection circuit 11 each having memory function, respectively, and then the difference $D = X_{max} - X_{min}$ of these values is obtained by a substraction circuit 12 thereby storing the value D in a region $D_1$ of the memory 9. The maximum value $M = |X_n - X_{n+1}|_{max}$ of the outputs of the absolute value circuit 7 is detected by a maximum value detection circuit 13 having a memory function thereby storing the value M in a region $M_1$ of the memory 9.

After storing the data $F_1$, $D_1$ and $M_1$ for the light receiving element array 101 in the memory 9, the memory 4, and the detection circuits 10, 11, 12 and 13 are cleared and then the outputs of the light receiving element array 102 are selected by the switch 1-1. The selected outputs are arithmetically operated in the same manner as the above described operation to obtain an evaluation function value $F_2$, a difference $D_2$ between a maximum value and a minimum value thereof, and a maximum value $M_2$ of the absolute value of the difference between adjacent light receiving elements, thereby storing the values in the regions $F_2$, $D_2$ and $M_2$, respectively, of the memory 9.

At the same time, outputs of a pair of light receiving elements 103 for detecting lateral shifted image are supplied to a calculation circuit 18 for an evaluation $F_3$ through a switch 1-2 controlled by the control circuit 20, an amplifier 2-2, and an A/D converter 3-2. The $F_3$ calculation circuit 18 supplies the evaluation value $F_3$ for the lateral shifted image under control of the control circuit 20, thereby storing the thus obtained evaluation value $F_3$ in a memory 19. The control circuit 20 selects any one of the image sharpness detection method and the image lateral shifted detection method in accordance with the flow chart shown in FIG. 5 based on the data stored in the memorys 9 and 19 and a memory 14 which stores the threshold values $\alpha_1$, $\alpha_2$, $\beta$ and B, and then decides each focus condition of the front focus condition, the in-focused condition and the rear focus condition based on the selected focus condition detecting method. The decided output of the control circuit 20 is latched by a latch circuit 16 of a display circuit 15 and the output of the latch circuit 16 operates a corresponding one of elements 17a, 17b, 17c and 17d (in this embodiment, light emitting diodes) thereby displaying corresponding condition so that the focusing adjustment can be effected automatically or manually based on the thus obtained decision.

As described above, the focus condition detecting method according to the present invention can perform an accurate detection of focus condition by using the most suitable focus condition detecting method selected from the image sharpness detection method and the image lateral shift detection method. Particularly, in the case of the object having a comparatively large but smoothly changing density difference, the focus condition detecting at the region close to in-focus can be suitably effected by using the image lateral shift detection method, such in the conventional method the focus condition detecting at the region close to in-focus is performed with poor focusing precision by using the image sharpness detection method.

Figure 8:
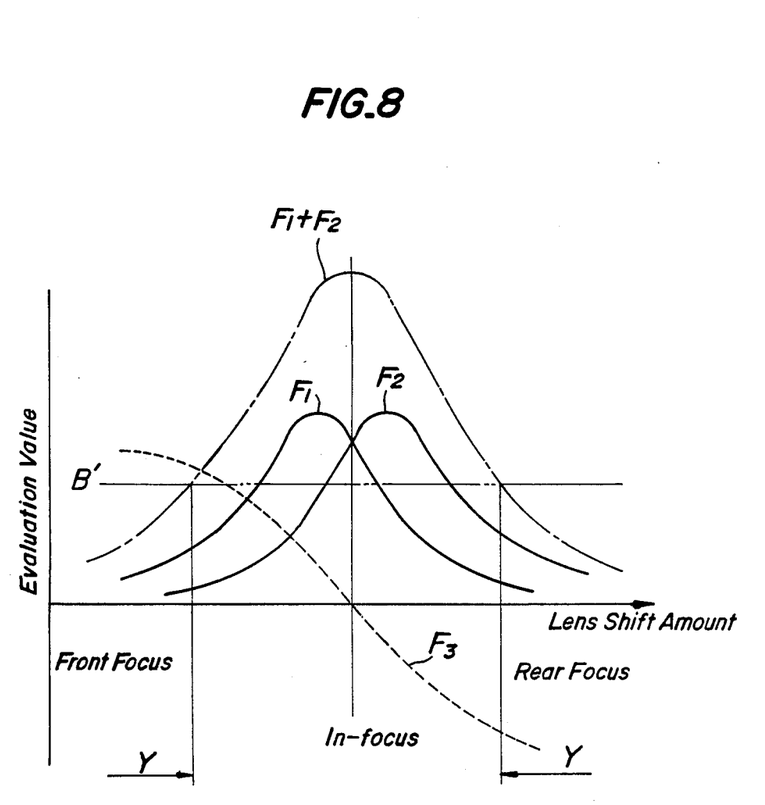
FIG. 8 is an explanatory view showing evaluation values of defocused image and lateral shifted image of another embodiment of the focus condition detecting method according to the present invention.
Figure 9:
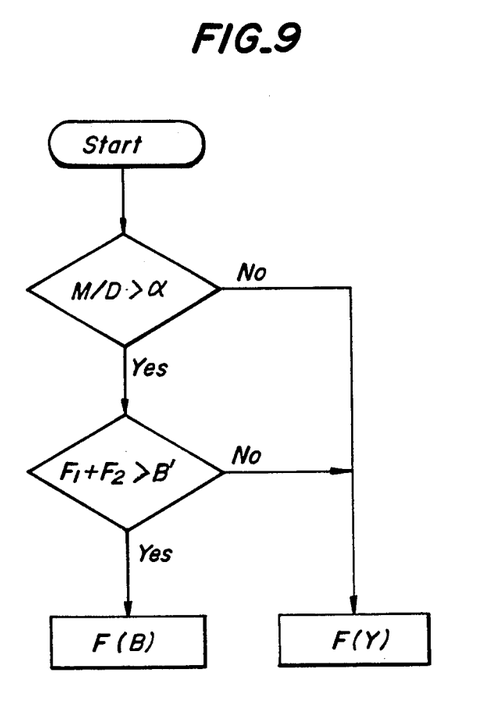
FIG. 9 is a flow chart showing another embodiment of a focus condition detecting method according to the present invention.

It is to be understood that the present invention is not limited in its application to the details of construction and arrangement of parts illustrated in the accompanying drawings, since the present invention is capable of other embodiments and of being practiced or carried out in various ways. Also it is to be understood that the phraseology or terminology employed herein is for the purpose of description and not of limitation. For example, the above described embodiment utilizes a deciding condition of $F_1$ or $F_2 > B$ as a means for selecting between the image sharpness detection method and the image lateral shift detection method, but as shown in FIG. 8 a deciding condition of $F_1 + F_2 > B'$ can also be utilized to as select the image lateral shift detection method in the region Y. Moreover, in the above embodiment the inclination M is compared with two threshold values $\alpha_1$ and $\alpha_2$, but the number of the threshold values $\alpha$ may be increased thereby deciding the in-focused condition within a finer range. The quotient M/D may also be utilized as a decision criterion. In this case, a part of the flow chart embodying such an alternative is shown in FIG. 9. In this alternative $F_1 + F_2 > B'$ is utilized instead of $F_1$, $F_2 > B$ shown in FIG. 5. D may also be a difference between partial maximum and minimum values instead of the difference between maximum and minimum values of outputs of all light receiving elements. The present embodiment explains the maximum value as $M = |X_n - X_{n+1}|_{max}$, but the maximum value may be selected as $M = M_i$ when the maximum value is $M_i = |X_n - X_{n+i}|_{max}$, wherein i is 1, 2, 3, ... without departing from the scope of the invention. Moreover, the maximum value may be selected as $$M = \sum_{i=1}^{k} M_i$$

by using the above maximum value $M_i$, wherein k is a value smaller than a value equal to the total number of elements minus one.

The above described embodiment explains an example having two kinds of evaluation values $F_1$ and $F_2$ of the image sharpness detection method and one kind of evaluation value $F_3$ of the image lateral shift detection method, but the number of the evaluation values is not limited to the above example. For example, when the photoelectric conversion elements for the image lateral shift detection method are arranged with the photoelectric conversion elements for the image sharpness detection method, or have the same optical path difference (refer to Japanese Patent Application No. 114,915/82), the number of evaluation function values of the image lateral shift detection method becomes two so that the evaluation values can be obtained in such a manner that the evaluation value becomes zero near the predetermined in-focused position by adding the above two evaluation values, and thus the in-focused condition may be decided in the same method as that of the above described embodiment. Therefore, the present invention may be utilized in the optical systems described in Japanese Patent Application Nos. 46,087/81 and 126,273/82 or the like.

What is claimed is:

1. A method of detecting a focus condition of an imaging optical system by combining an image sharpness detection method for detecting in-focus condition by obtaining an evaluation value representing sharpness of images projected upon a photoelectric detecting means including at least two arrays each comprising a plurality of light receiving elements, each element producing a photoelectrically converted output, and an image lateral shift detection method for detecting in-focus condition by a positional relation between an image projected upon a photoelectric detecting means including at least two arrays comprising a plurality of light receiving elements, each element producing a photoelectrically converted output, by light flux transmitted through a first part of an exit pupil of an optical lens and an image projected upon the photoelectric detecting means by light flux transmitted through a second part of the exit pupil of the optical lens, comprising the steps of:

calculating an evaluation function representing the state of density distribution of the image projected upon the photoelectric detecting means; and selecting either the image sharpness detection method or the image lateral shift detection method in accordance with the calculated evaluation function, thereby detecting the in-focus condition.

2. A method of detecting a focus condition of an imaging optical system as recited in claim 1, wherein the selection of the image sharpness detection method or the image lateral shift detection method is performed by comparing a maximum value M of the absolute value of the difference between photoelectrically converted outputs from adjacent light receiving elements with predetermined threshold values $\alpha_1$ and $\alpha_2$, by comparing an evaluation function value F of at least one maximum value M of the absolute value of the difference between photoelectrically converted outputs from adjacent light receiving elements with predetermined threshold value B, and by comparing a difference D between photoelectrically converted outputs of respective light receiving element arrays, with predetermined threshold value $\beta$.

3. A method of detecting a focus condition of an imaging optical system as claimed in claim 1, wherein the selection of the image sharpness detection method or the image lateral shift detection method is performed by comparing a maximum value M of the absolute value of the difference between photoelectrically converted outputs from adjacent light receiving elements with predetermined threshold values $\alpha_1$ and $\alpha_2$, by comparing an evaluation function value F of at least one maximum value M of the absolute value of the difference between photoelectrically converted outputs of every i light receiving elements with predetermined threshold value B, i being a positive integer, and by comparing a difference D between photoelectrically converted outputs of respective light receiving element arrays with predetermined threshold value $\beta$.

4. A method of detecting a focus condition of an imaging optical system as recited in claim 2 or 3, wherein the maximum value M is obtained as $$M = \sum_{i=1}^{k} |X_n - X_{n+i}| \text{ Max}$$

and the difference D is obtained as $D = X_{max} - X_{min}$, wherein $X_n$ is a photoelectric converted output of an n-th light receiving element in a light receiving element array, $X_{max}$ is a maximum value of photoelectric converted outputs from the light receiving element array, $X_{min}$ is a minimum value of the photoelectric converted outputs, and where k is an integer smaller than the total number of elements minus one.

5. A method of detecting a focus condition of an imaging optical system as recited in claim 2 or 3, wherein when the maximum value M is larger than the threshold value $\alpha_1$ the focus condition is decided by a difference of evaluation function values which are obtained by the image sharpness detection method.

6. A method of detecting a focus condition of an imaging optical system as recited in claim 2 or 3, wherein when evaluation function values obtained by the image sharpness detection method are smaller than the threshold value B, the focus condition is decided by an evaluation function value which is obtained by the image lateral shift detection method.

7. A method of detecting a focus condition of an imaging optical system as recited in claim 2 or 3, wherein when the maximum value M is smaller than the threshold value $\alpha_2$ ($\alpha_1 > \alpha_2$), the focus condition is decided by the image lateral shift detection method.

8. A method of detecting a focus condition of an imaging optical system as recited in claim 2 or 3, wherin when the maximum value M is between threshold values $\alpha_1$ and $\alpha_2$, the difference D serves as a further comparison factor.

9. A method of detecting a focus condition of an imaging optical system as recited in claim 8, wherein when the difference D is smaller than the threshold value $\beta$ and the evaluation function values are larger than the threshold value B, the focus condition is decided by the image sharpness detection method, but when the difference D is smaller than the threshold value $\beta$ and the evaluation function values are each smaller than the threshold value B, the focus condition is decided by the image lateral shift detection method.

10. A method of detecting a focus condition of an imaging optical system as recited in claim 8, wherein when the difference D is larger than the threshold value $\beta$, the focus condition is decided by the image lateral shift detection method.

11. A method of detecting a focus condition of an imaging optical system as recited in claim 2 or 3, wherein when a quotient of the maximum value M and the difference D is smaller than a predetermined threshold value $\alpha$, the focus condition is decided by the image lateral shift detection method.

12. A method of detecting a focus condition of an image optical system as claimed in claim 2 or 3, wherein when a quotient of the maximum value M and the difference D is larger than a predetermined threshold value $\alpha$, the focus condition is detected by the image sharpness detection method.

13. A method of detecting a focus condition of an image optical system as claimed in claim 12, wherein a sum of evaluation function values $F_1$ and $F_2$, $F_1$ and $F_2$ being obtained by the image sharpness detection method, is smaller than a threshold value B', the focus condition is decided by the image lateral shift detection method and when the sum of $F_1$ and $F_2$ is larger than the threshold value B', the focus condition is decided by the image sharpness detection method.

* * * * *